UNITED STATES PATENT OFFICE.

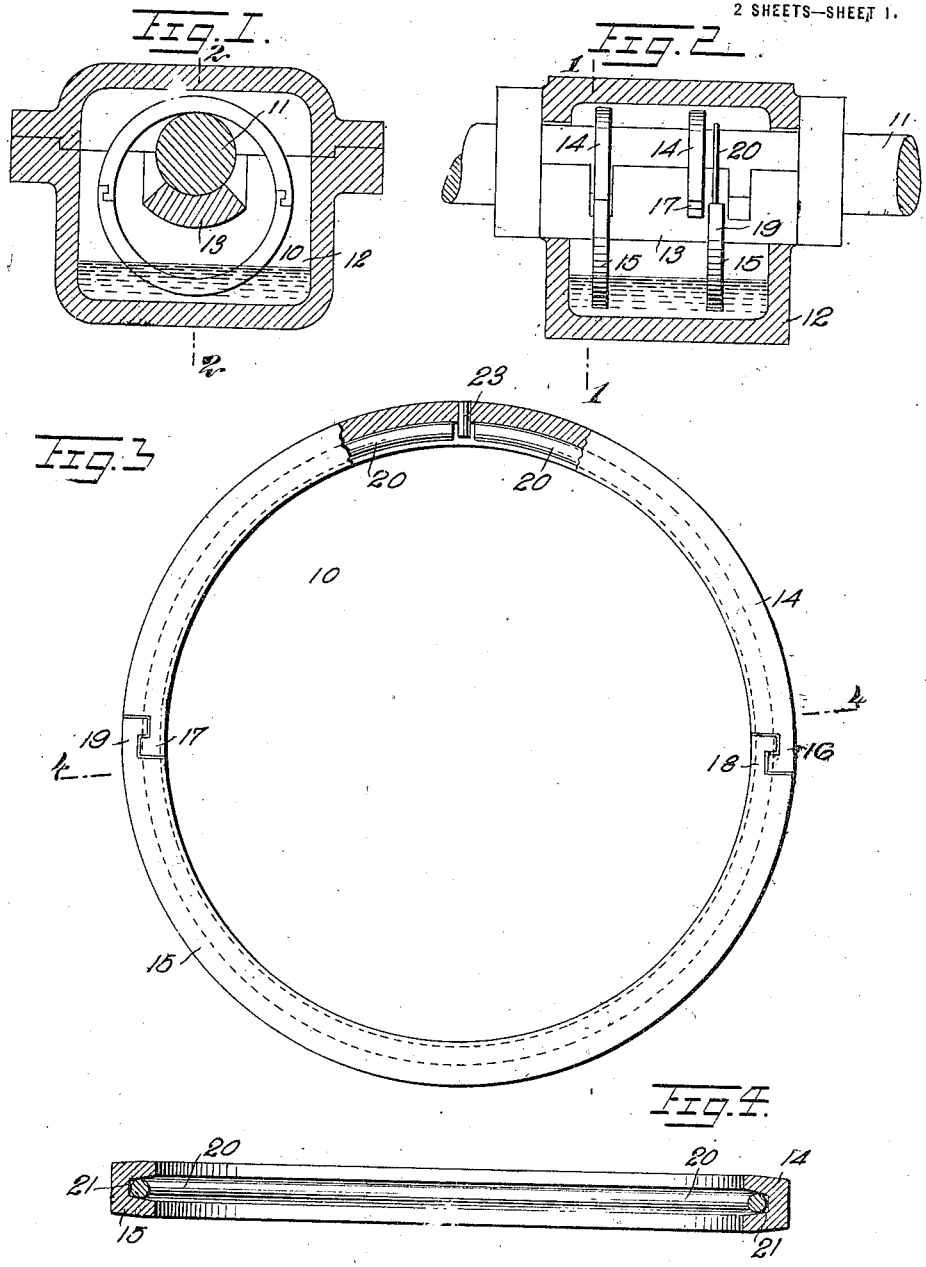

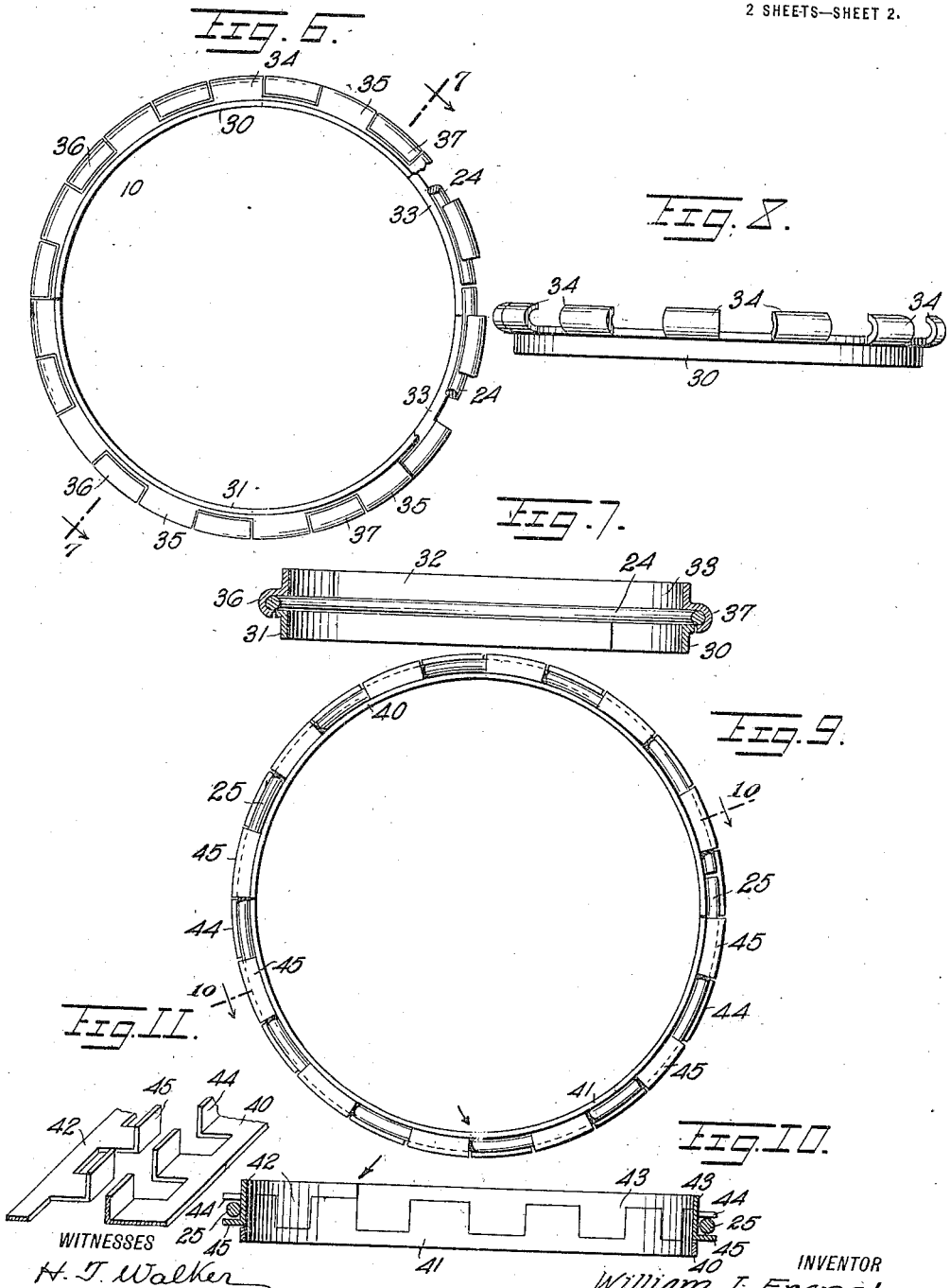

WILLIAM J. FRANCKE, OF HIGHLAND PARK, NEW JERSEY.

OIL-RING.

1,178,308. Specification of Letters Patent. Patented Apr. 4, 1916.

Application filed November 9, 1915. Serial No. 60,577.

*To all whom it may concern:*

Be it known that I, WILLIAM J. FRANCKE, a citizen of the United States, and a resident of Highland Park, in the county of Middlesex and State of New Jersey, have invented a new and Improved Oil-Ring, of which the following is a full, clear, and exact description.

The invention relates to oiling devices for shafts or other revolving elements of high speed motors and other machines and devices.

The object of the invention is to provide a new and improved oil ring arranged to permit of conveniently placing it in position in the bearing and on the shaft or other revoluble part without disturbing the same.

To produce the desired result, use is made of an oil ring made in sections having interlocking means to connect the sections with each other in a side wise direction, and a spring ring engaging the sections to hold the same together against sidewise movement.

A practical embodiment of the invention is represented in the accompanying drawings forming a part of this specification, in which similar characters of reference indicate corresponding parts in all the views.

Figure 1 is a face view of the oil ring as applied with the oil well and the shaft shown in section on the line 1—1 of Fig. 2; Fig. 2 is a sectional side elevation of the same on the line 2—2 of Fig. 1 and showing one of the oil rings closed and the other open; Fig. 3 is an enlarged side elevation of the oil ring with parts in section; Fig. 4 is a sectional plan view of the same on the line 4—4 of Fig. 3; Fig. 5 is a similar view of a modified form of the same; Fig. 6 is a face view of another modified form of the oil ring with parts broken out; Fig. 7 is a sectional plan view of the same on the line 7—7 of Fig. 6; Fig. 8 is a plan view of one of the sections of the oil ring shown in sections 6 and 7; Fig. 9 is a face view of another modified form of the oil ring; Fig. 10 is a sectional plan view of the same on the line 10—10 of Fig. 9; and Fig. 11 is a sectional perspective view of portions of the sections of the oil ring shown in Figs. 9 and 10.

One or more oil rings 10 are hung on a shaft or other removable element 11 and the rings extend into the oil well 12 to pick up the oil and deliever it to the revolving element 11 to lubricate the latter in its bearing 13. Each oil ring 10 is preferably made in two sections 14 and 15, as shown in Figs. 1 and 2 or the four sections illustrated in Figs. 6 to 10, but I do not limit myself to the number of sections as each oil ring may be made in any desired number of sections. The sections 14 and 15 of the oil ring shown in Figs. 1 and 4 are provided at their ends with interlocking means 16, 17 and 18, 19 arranged to allow of interlocking the sections with each other in a sidewise direction. Thus one section may be hung on the revolving element 11 while the other section is slipped under the bearing or brass 13 (see the oil ring shown to the right in Fig. 2), and then the sections are moved sidewise in engagement with each other at the interlocking means 16, 17 and 18, 19, to complete the ring, as indicated to the left in Fig. 2. Thus the oil ring can be placed in position on the revolving element without disturbing the latter or its bearing.

In order to hold the sections 14 and 15 against accidental displacement in a sidewise direction, use is made of a split spring ring 20 fitting into an annular groove 21 formed in the inner edge of the ring or fitting into an annular groove 22 formed in the peripheral face of the oil ring, as indicated in Fig. 5. A pin 23 is attached to the section 14, preferably at the middle thereof and extends into the split of the ring 20 so as to hold the latter against turning in the groove 21 and to hold the split ring 20 spaced from the interlocking ends 16, 17 and 18, 19 of the ring sections 14 and 15. As shown in Fig. 4, the spring ring 20 lies completely within the groove 21 and hence is not in contact with the revolving element 11, and the side walls of the groove 21 are preferably beveled in opposite directions so that the sides of the ring 20 have line contact with the said beveled walls to accurately hold the sections 14 and 15 in alinement relatively one to the other.

In using the oil ring the split spring ring 20 is readily opened a sufficient distance to pass it around the revolving element 11 and the bearing 13, and the two sections 14 and 15 can be separately placed in position and then engaged with the ring 20 and interlocked with each other by their interlocking means 16, 17 and 18, 19. It is further understood that the spring ring 20 exerts an outward pressure against the sections 14 and 15 so as to securely hold the interlocking means 16, 18 and 17, 19 in firm relation one to the other.

In the modified form shown in Figs. 6, 7 and 8, the oil ring is formed of two pairs of sections 30, 31 and 32, 33, of which the sections 30 and 31 break joint with the sections 32, 33, and the sections 30, 31 are provided on their peripheral faces with spaced transversely extending interlocking members 34, 35 alternating with corresponding interlocking members 36, 37 formed on the sections 32 and 33. The members 34, 35, 36, 37 are bent in half round shape to form a continuous annular groove for the reception of the split spring ring 24 employed for holding the sections in position one relatively to the other.

In the modified form shown in Figs. 9, 10 and 11 the oil ring 10 is made in pairs of sections 40, 41 and 42, 43, similar to the sections 30, 31 and 32, 33 with the exception that the interlocking members 34, 35 are provided with alternately extending interlocking flanges 44, 45 extending outwardly and forming an annular groove for the reception of the split ring 25 to hold the sections together.

It will be noticed that in either of the cases described the sections are provided with interlocking means to permit of conveniently placing the disassembled sections in position on the revolving element 11 and the bearing 13, and for then assembling the said sections and interlocking the same as well as holding the sections against displacement by the split spring ring 20, 24 or 25. For high speed motor shafts of large diameter the oil ring 10 shown in Figs. 1, 2, 3, 4 and 5 is preferably used and for shafts of smaller diameter the rings illustrated in Figs. 6 to 11 are used, it being understood that the sections of the oil rings shown in Figs. 6 to 11 can be readily made of pressed steel, thus providing an exceedingly strong and durable construction.

By reference to Fig. 3, it will be noticed that the interlocking means 16, 17 and 18, 19 are in the form of interlocking hooks and each section is a duplicate of the other so that all the sections can be made alike and assembled in the manner above set forth.

Having thus described my invention, I claim as new and desire to secure by Letters Patent:

1. An oil ring adapted to hang on a revolving element and extend into an oil well, the oil ring being made in sections provided with sidewise interlocking means, and retaining means held on the oil ring and engaging the sections thereof to hold the latter against sidewise movement.

2. An oil ring adapted to hang on a revolving element and extend into an oil well, the oil ring being made in sections provided with sidewise interlocking means, and a split retaining ring engaging the sections to hold the same against sidewise movement.

3. An oil ring adapted to hang on a revolving element and extend into an oil well, the oil ring being made in sections provided with sidewise interlocking means, a split retaining ring engaging the sections to hold the same against sidewise movement, the split of the said retaining ring breaking joint with the said sections, and means on the said oil ring and engaging the said retaining ring to hold the latter against movement on the oil ring.

4. An oil ring adapted to hang on a revolving element and extend into an oil well, the oil ring being made in sections provided with sidewise interlocking means, a split retaining ring engaging the sections to hold the same against sidewise movement, the split of the said retaining ring breaking joint with the said sections, and a pin held on one of the said sections and extending into the split of the retaining ring.

5. An oil ring adapted to hang on a revolving element and extend into an oil well, the oil ring being made in sections provided with an annular groove, interlocking means detachably connecting the sections sidewise with each other, and a split spring retaining ring fitting into the said groove.

6. An oil ring adapted to hang on a revolving element and extend into an oil well, the oil ring being made in sections provided at the inner surface with an annular groove having beveled side walls, interlocking means detachably connecting the said sections sidewise with each other, and a split ring fitting into the said groove and seated on the said side walls to hold the sections against sidewise movement.

7. An oil ring adapted to hang on a revolving element and extend into an oil well, the oil ring being made in sections provided at the inner surface with an annular groove having beveled side walls, interlocking means detachably connecting the said sections sidewise with each other, and a split ring fitting into the said groove and seated on the said side walls to hold the sections against sidewise movement, the split of the retaining ring breaking joint with the joints of the oil ring sections, and a pin on one of the said sections and extending into the split of the retaining ring.

In testimony whereof I have signed my name to this specification in the presence of two subscribing witnesses.

WILLIAM J. FRANCKE.

Witnesses:
 THEO. G. HOSTER,
 PHILIP D. ROLLHAUS.